United States Patent
Yu et al.

(10) Patent No.: US 10,000,716 B2
(45) Date of Patent: Jun. 19, 2018

(54) AQUEOUS LOW FRICTION COATING FOR TELECOMMUNICATION CABLES

(71) Applicants: 3M INNOVATIVE PROPERTIES COMPANY, Saint Paul, MN (US); Zhigang Yu, Shanghai (CN)

(72) Inventors: Zhigang Yu, Shanghai (CN); Yaming Wang, Shanghai (CN); Wei Cai, Shanghai (CN); Naiyong Jing, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 3 days.

(21) Appl. No.: 15/039,894

(22) PCT Filed: Dec. 4, 2013

(86) PCT No.: PCT/CN2013/088504
§ 371 (c)(1),
(2) Date: May 27, 2016

(87) PCT Pub. No.: WO2015/081511
PCT Pub. Date: Jun. 11, 2015

(65) Prior Publication Data
US 2017/0022440 A1    Jan. 26, 2017

(51) Int. Cl.
*C10M 169/04* (2006.01)
*C10M 107/42* (2006.01)
(Continued)

(52) U.S. Cl.
CPC ............ *C10M 107/42* (2013.01); *C09D 5/00* (2013.01); *C09D 7/61* (2018.01); *C09D 7/67* (2018.01); *C09D 127/18* (2013.01); *C09D 175/04* (2013.01); *C10M 125/26* (2013.01); *C10M 133/38* (2013.01); *G02B 6/443* (2013.01); *G02B 6/4463* (2013.01); *C08L 2205/025* (2013.01); *C08L 2205/03* (2013.01);
(Continued)

(58) Field of Classification Search
None
See application file for complete search history.

(56) References Cited

U.S. PATENT DOCUMENTS 3,925,216 A    12/1975   Moorhouse
4,378,299 A     3/1983   Alexander
(Continued)

FOREIGN PATENT DOCUMENTS

CA          1069025        1/1980
CN       102746754 A      10/2012
(Continued)

OTHER PUBLICATIONS

Supplementary Search Report for EP13898599.9, dated Apr. 25, 2017, 4 pp.
(Continued)

*Primary Examiner* — Vishal Vasisth
(74) *Attorney, Agent, or Firm* — Janet A. Kling

(57) ABSTRACT

A fluoropolymer coating composition comprises: fluorinated homopolymer particles dispersed in water, fluorinated copolymer particles dispersed in water, non-fluorinated polymer particles dispersed in water; and at least one aziridine compound comprising at least two aziridine groups. The composition is especially useful in low friction coating for telecommunication cables.

18 Claims, 2 Drawing Sheets

(51) Int. Cl.

| | | |
|---|---|---|
| | *C09D 127/18* | (2006.01) |
| | *C09D 5/00* | (2006.01) |
| | *C09D 175/04* | (2006.01) |
| | *C10M 125/26* | (2006.01) |
| | *C10M 133/38* | (2006.01) |
| | *G02B 6/44* | (2006.01) |

(52) U.S. Cl.
CPC ............... *C10M 2201/105* (2013.01); *C10M 2213/0606* (2013.01); *C10M 2213/0623* (2013.01); *C10M 2215/22* (2013.01); *C10N 2240/50* (2013.01); *G02B 6/4466* (2013.01)

(56) References Cited

U.S. PATENT DOCUMENTS

| | | | |
|---|---|---|---|
| 5,149,564 | A | 9/1992 | Kato et al. |
| 5,643,972 | A | 7/1997 | Wang et al. |
| 6,680,357 | B1 | 1/2004 | Hedhli et al. |
| 6,927,265 | B2 | 8/2005 | Kaspar et al. |
| 7,652,095 | B2 | 1/2010 | Filiatrault et al. |
| 7,813,606 | B2 | 10/2010 | Yasutomi et al. |
| 8,412,011 | B2 | 4/2013 | Yasutomi et al. |
| 8,478,095 | B2 | 7/2013 | Takeda et al. |
| 2002/0111228 | A1 | 8/2002 | Chang |
| 2003/0092825 | A1 | 5/2003 | Visca et al. |
| 2005/0027076 | A1 | 2/2005 | Mizuno et al. |
| 2006/0065427 | A1 | 3/2006 | Kummer et al. |
| 2006/0148971 | A1 | 7/2006 | Jing et al. |
| 2006/0208394 | A1 | 9/2006 | Bolcar |
| 2006/0251837 | A1 | 11/2006 | Cnossen et al. |
| 2011/0150402 | A1 | 6/2011 | Hoshino et al. |
| 2012/0237778 | A1 | 9/2012 | Mao et al. |
| 2012/0280479 | A1 | 11/2012 | Barth et al. |
| 2013/0041089 | A1 | 2/2013 | Forgione et al. |

FOREIGN PATENT DOCUMENTS

| | | |
|---|---|---|
| EP | 0 391 568 A2 | 10/1990 |
| EP | 0 659 846 A2 | 6/1995 |
| EP | 0794345 | 9/1997 |
| EP | 0964037 | 12/1999 |
| EP | 1835320 | 9/2007 |
| EP | 2 639 060 A2 | 9/2013 |
| FR | 2857461 | 1/2005 |
| GB | 1 358 428 A | 7/1974 |
| JP | 2001-052536 | 2/2001 |
| JP | 2001-083384 A | 3/2001 |
| JP | 2004-272069 | 9/2004 |
| JP | 2007-183477 | 7/2007 |
| JP | 2007-191709 | 8/2007 |
| JP | 2007-191709 A | 8/2007 |
| JP | 2009-211017 | 9/2009 |
| JP | 2010-124569 | 6/2010 |
| JP | 2011-102922 | 5/2011 |
| JP | 2011-169941 | 9/2011 |
| JP | 2011-242717 | 12/2011 |
| JP | 2013-076932 | 4/2013 |
| WO | WO 2001-04220 | 1/2001 |
| WO | WO 2007/019335 | 2/2007 |
| WO | WO 2010-123021 | 10/2010 |
| WO | WO 2013-065717 | 5/2013 |
| WO | WO 2015-066868 | 5/2015 |
| WO | WO 2015-069502 | 5/2015 |

OTHER PUBLICATIONS

International Search Report for Appl. No. PCT/CN2013/088504, dated Sep. 5, 2014, 5 pages.
Search Report for CN 201380081255.9, dated Feb. 15, 2017, 1 pg.
Search Report for Appl. No. RU2016118034, dated Dec. 18, 2017, 2 pp.

AQUEOUS LOW FRICTION COATING FOR TELECOMMUNICATION CABLES

This application is a 371 of PCT/CN2013/088504, filed Dec. 4, 2013.

BACKGROUND OF THE INVENTION

Field of the Invention

The present invention relates to an aqueous low friction coating for telecommunication cables. In particular, the present coating includes one or more fluoropolymer latexes, a non-fluoropolymer latex, and a polyaziridine that can be applied onto polymer substrate.

Background

Proliferation of Fiber to the home (FTTH), fiber to the premise (FTTP) or, more generally, fiber to the X (FTTx) networks requires the installation of new optical cable links in existing premises or buildings. Frequently, these new fiber optic cables need to be fished through walls, run through existing cable ducts or through other confined spaces. Preferred optical fiber cables used in this last link in the FTTx network are generally small and flexible and can be difficult to push through already crowded existing cable ducts or other confined spaces as a result of friction between the cable sheath of the optical fiber cable being installed with existing cables as well as with the cable duct itself. Thus, having an optical fiber cable having a low friction surface is highly desirable in order to facilitate the installation of new cables into existing building structures.

For example, inorganic particulates (e.g. talc), silicone materials or fatty acid amides have been incorporated into the material outer cable jacket in some telecommunication and electrical cables in the extruder in order to reduce the coefficient of friction of the resulting cable. Extrusion of a low friction jacket material in this manner requires that the lubricative material be dispersed throughout the bulk phase of the cable jacket rather than being disposed at the outer surface of the telecommunication cable where it is needed to provide beneficial low friction characteristics. If these materials are not adequately tied into the jacket resin matrix, low molecular weight components can bleed out of the cable jacket matrix, reducing the low friction performance of these materials over time.

Fluoroplastics have excellent mechanical and electrical properties including low friction coefficients and good self-lubricating performance. Currently, fluoroplastics are widely used in chemical industry, electronics, electrical engineering, aviation, aerospace, textiles, construction, automobiles and other industrial fields. However, the intrinsic characteristics of fluoroplastics can make processing very difficult. While dispersing of fluoroplastics including Polytetrafluoroethylene (PTFE) in polymer binders for lubricating coating applications is known, these coatings generally lack the desired level of durability due to the non-compatibility between PTFE and the non-fluoroplastic polymers or poor adhesion of the coating to polymer substrates such as the materials commonly used as telecommunication cable jacket materials.

Thus, what is needed is a robust and durable low friction coating that can stand up to repeated abrasion without decreasing the low friction behavior of the coating.

SUMMARY

In one embodiment, a fluoropolymer coating composition includes a fluorinated homopolymer particles dispersed in water, a fluorinated copolymer particles dispersed in water, a non-fluorinated polymer particles dispersed in water; and at least one aziridine compound comprising at least two aziridine groups. In one exemplary aspect, the non-fluorinated polymer particles in the fluoropolymer coating composition can be a polyurethane latex material and/or an acrylic latex material. In another exemplary aspect, the fluorinated homopolymer particles comprise polytetrafluoroethylene latex while in another aspect, the fluorinated copolymer particles is a copolymer of tetrafluoroethylene, hexafluoropropylene and vinylidene fluoride. The exemplary fluoropolymer coating can optionally inorganic oxide nanoparticles, e.g. nanoparticle silica having an average particle size of less than 100, less than 50 nm or less than 30 nm.

In another embodiment, an exemplary fluoropolymer coating composition is applied to articles having an exposed polymer surface to yield an article having a low fiction surface. In particular, an article having a low friction surface comprises a substrate having an exposed polymer surface and a thin layer of a low friction coating disposed on the exposed polymer surface of the substrate, wherein the low friction coating comprises a fluorinated homopolymer, a fluorinated copolymer, and non-fluorinated polymer; that have been crosslinked by a polyazidine crosslinking agent. In an exemplary aspect, the exposed polymer surface comprises a low surface energy plastic. Alternatively, the exposed polymer surface can be selected from polyethylene, polyester, polyvinylchloride, polyurethane and the like.

In one exemplary aspect, a polyester surface that has been coated with one of the exemplary coatings will have an initial coefficient of friction of less than 0.5 which will be reduced further after abrasion or wear of the surface. In an alternative exemplary aspect, a polyethylene surface that has been coated with one of the exemplary coatings will have an initial coefficient of friction of less than 0.4 which will be reduced further after abrasion or wear of the surface. While the initial coefficient of friction of a low friction coated surface may vary slightly based upon the nature of the substrate onto which the low friction coating is applied, the initial coefficient of friction of the desired coatings should be less than 0.5.

In an alternative embodiment, the article is a low friction telecommunication cable comprising at least one optical fiber surrounded by a polymeric cable jacket wherein the low friction coating is applied to an external surface polymeric cable jacket. In an exemplary aspect, the telecommunication cable will have a thin layer of the low friction coating (i.e. a coating thickness that is less than 100 microns, less than 50 microns, less than 20 microns or less than 10 microns) disposed on the outer surface of polymeric cable jacket. In an alternative aspect, the coated telecommunication cable can be characterized by a ratio of the coating thickness to the minimum critical dimension of the telecommunication cable is less than or equal to 6:94, wherein the minimum critical dimension of the telecommunication cable dimension is defined as the minimum diameter, width or height of the cross-section of the telecommunication cable coated with the low friction coating. In an exemplary aspect, the telecommunication cable is an FRP drop cable.

DETAILED DESCRIPTION

Figure 1:
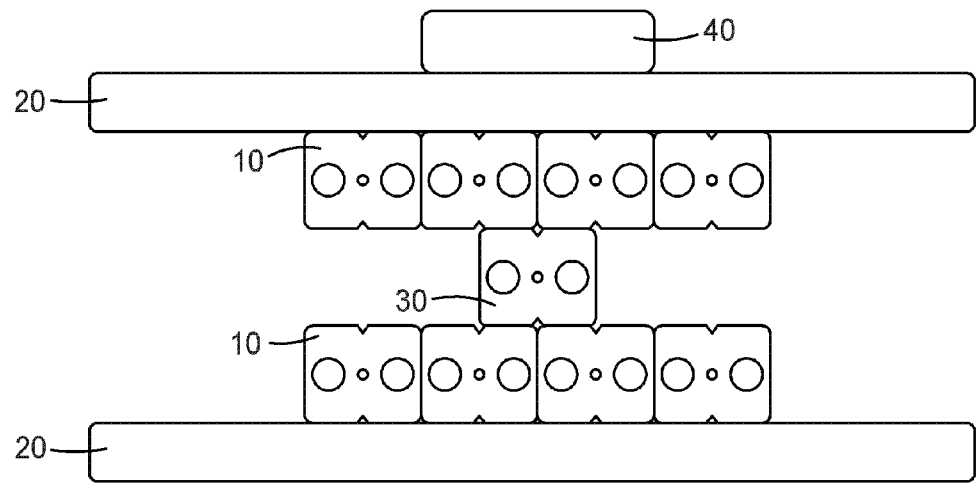
FIG. 1 is a schematic cross-sectional view of the test arrangement used to determine the coefficient of friction between cables.

The following definitions apply throughout the specification and claims.

The term "aqueous" means that the liquid of the coating contains at least 70%, 80%, 90% or 95% by weight of water and have a solids content of about 5%-30% percent. The aqueous liquid medium comprises water without the presence of a water-soluble organic cosolvent(s).

The term "nanoparticles" refers to particles with an average particle size of less than or equal to about 100 nanometers (nm).

A "dried" coating is a coating that has been applied from an aqueous coating where the water has been substantially removed, for example by evaporation. A dried coating may also be cured (i.e., crosslinked) as a result of reaction between the reactive functional groups of the fluoropolymer and the aziridine compound, for example during evaporation. The rate and degree of curing can typically be enhanced by heating the coating composition during or after the drying process.

The term "non-fluorinated polymer" refers to hydrocarbon based polymers that do not contain any fluorine such as polyurethane polymers, acrylic polymers and the like.

The term "polyurethane" includes any polymeric material that comprises polyurethane (PU) segments. The term "polyurethane segment" refers to at least two urethane and/or urea groups that are connected by an organic group. In some embodiments, the polyurethane used in the coating composition is a thermoplastic aliphatic polyurethane. Thermoplastic polyurethane compositions are generally the reaction product of a diisocyanate with short-chain diols (also referred to as chain extenders) and diisocyantes with long-chained difunctional diols (known as polyols). Polyurethanes are characterized as having urethane groups, i.e. —NH—(C═O)—O— that link the segments derived from the diisocyanate and diol. Such urethane group comprise a carbonyl group, i.e. a carbon atom double bonded to an oxygen atom, C═O. In an exemplary aspect, the polyurethane is in the form of a polyurethane latex dispersion.

Examples of commercially available aqueous aliphatic polyurethane emulsions include those available from DSM NeoResins, Inc. of Wilmington, Mass. as the trade designations "NEOREZ"; from Essential Industries, Inc. of Merton, Wis. as the trade designations "ESSENTIAL"; from Lubrizol, Inc. of Cleveland, Ohio as the trade designations "SANCURE" and "TURBOSET"; and from Stahl USA, Peabody, Mass. as the trade designations "RU-077" and "RU-075".

The term "acrylic polymer" includes any polymer or copolymer of acrylic acid, methacrylic acid, ester of these acids or acrylonitrile. Examples of commercially available aqueous aliphatic acrylic emulsions include acrylic latexes available from Dow Coating Materials as the trade designations "ROSHIELD™" and "RHOPLEX™"; from Arkema Coating Resins as the trade designation "UCAR™"; and from Lubrizol Advanced Materials, Inc. as the trade designation "HYCAR"; and from DSM NeoResins as the trade designation "NEOCRYL".

The exemplary dried coating can comprise a non-fluorinated polymer in the range of about 3 wt. % to about 35 wt. %, preferably about 3 wt. % to about 15 wt. % and can comprise a single non-fluorinated polymer or a combination of more than one non-fluorinated polymer.

The aqueous fluoropolymer coating composition preferably comprises a waterborne fluoropolymer. Waterborne fluoropolymers typically comprise small concentrations of polar functional groups including hydroxyl and carboxylate groups. For example, the uses of sulfinates, such as ammonium perfluorobutyl sulfinate, as part of the initiator system can produce such polar groups.

In some embodiments, the fluoropolymer comprises at least about 0.01, 0.02, 0.03, 0.04, or 0.05 up to 0.1 mole % of polar functional groups including hydroxyl and/or carboxylate groups. Such hydroxyl and/or carboxylate groups are surmised to crosslink with aziridine groups of the aziridine compound.

The aqueous coating composition described herein comprises at least one fluoropolymer latex dispersion having one type of fluoropolymer or a blend of the various fluoropolymers as described herein. In some embodiments, the fluoropolymer is a homopolymer of a fluorinated monomer such as polytetrafluoroethylene (PTFE). In fluoropolymer latex dispersions, the PTFE can be formed of high molecular weight polymer chains and be highly crystalline in nature. In other embodiments, the fluoropolymer is a copolymer of two or more fluorinated monomers. In yet other embodiments, the fluoropolymer is a copolymer of one or more fluorinated monomers and at least one non-fluorinated monomer. For example, the fluoropolymer may be a copolymer of tetrafluoroethylene (TFE) and ethylene; or a copolymer of TFE, hexafluoropropylene (HFP), and vinylidene fluoride which can have a relatively low crystallinity.

In an exemplary embodiment, the coating formulation can comprise a fluorinated homopolymer latex dispersion and a fluorinated copolymer latex dispersion. In an exemplary aspect, the dried coating formulation can comprise from about 5 wt. % to about 80 wt. %, preferably from about 15 wt. % to about 75 wt. % fluorinated homopolymer and from about 5 wt. % to about 90 wt. %, preferably from about 10 wt. % to about 75 wt. % fluorinated copolymer.

The exemplary aqueous fluoropolymer coating solution is a mixture of a high crystalline PTFE latex, a THV latex and a hydrocarbon latex, such as a polyurethane or a polyacrylate, latex to produce a durable low friction coating for polymer substrates. The polymer substrates can include film based substrates or elongated substrates having and outer polymeric layer such as a telecommunication cable having a polymeric outer jacket. In an exemplary aspect the polymeric substrates usable with the coating composition described herein can be made of polyethylene terephthalate (PET), polybutylene terephthalate, polycarbonate (PC), acrylic polymers, polystyrene, polysulfone, polyethersulfone, cellulose acetate butyrate, polyolefins such as polyethylene (PE) and poly propylene, polyvinylchloride (PVC), polyamide, polyurethane, polyimide, polyurea, and the like, including blends and laminates thereof. In an exemplary aspect, fluoropolymer coating solution can optionally include nanoparticle silica. The coating adhered well to polymer substrates in the presence of a polyaziridine as a crosslinker and an adhesion promoter. The resulting coating showed good lubricative properties, even after abrasion, has low surface energy and is optically clear with anti-reflective properties. In one embodiment, the THV/PU binder and PTFE-THV compatibility greatly improve the interfacial adhesion between the PTFE slippery coating and polymer substrates for mechanical durability.

The fluoropolymer and non-fluorinated polymer dispersed in the aqueous diluent (i.e. water) can be film-forming polymers. Suitable polymer latexes and methods for making them are widely known in the art, and many are commercially available. Typically, the particles in the fluoropolymer latexes are substantially spherical in shape. Typically, the polymer core can comprise one or more water-insoluble polymers. Useful polymer particle sizes include those typical of latexes and other dispersions or emulsions. Typical polymer particle sizes are in a range of from about 0.01 micrometers (10 nm) to 100 micrometers. In some embodiments, the average particle size is at least 20, 30, 40, 50, or 60 nm. In some embodiments, the average particle size of the fluoropolymer and/or non-fluorinated polymer is no greater than 400 or 350 nanometers. In some embodiments, the average particle size of the fluoropolymer and/or non-fluorinated polymer is no greater than 300, 250, 200, 100 or 75 nanometers. Particles in the range from about 1 nm to 100 nm are often termed "nanoparticles" while those from about 200 nm (0.2 micrometers) up to about 2 micrometers are often termed "microparticles".

The fluoropolymer and non-fluorinated polymer are typically present as discrete particles. Since the fluoropolymer and polymeric binder are not soluble in or swelled by the aqueous liquid medium, both the fluoropolymer and non-fluorinated polymer are generally present in particle form. Hence, the fluoropolymer and non-fluorinated polymer typically do not form a continuous interpenetrating network. The fluoropolymer and non-fluorinated polymer can form a chemical network by reaction of the aziridine groups of a polyaziridine with the carboxylic groups of the fluoropolymer latex and non-fluorinated polymer latex. The fluoropolymer particles will tend to phase separate from non-fluorinated polymer forming a thin outer surface layer that is rich in fluoropolymers. This phase separation typically occurs during the drying of the coating composition. The outer surface layer will have a greater concentration of fluoropolymer than the underlying mixture of fluoropolymer particles and non-fluorinated polymer particles. The outer fluoropolymer layer can provide lubricity, chemical (e.g. solvent) resistance, and weatherability at a lower cost when compared to an extruded fluoropolymer layer due to the thinness of the fluoropolymer layer. The interface of the dried coating adjacent the polymer substrate exhibits better adhesion by the inclusion of the aziridine compound and the non-fluorinated polymer. Additionally, the inclusion of the non-fluorinated polymer can improve/enhance the mechanical properties. The non-fluorinated polymer can also function as a low-cost filler that reduces the cost of the coating relative to fluoropolymer coatings lacking the inclusion of non-fluorinated polymer.

The fluoropolymer coating composition can include one or more aziridine compounds which can react with both the fluoropolymer and non-fluorinated polymer to form a heterogeneous polymer network having fluoropolymer rich regions. The aziridine compound comprises at least two aziridine groups. An exemplary aziridine can be represented by the following chemical structure which is available from DSM under the trade designation "CX-100".

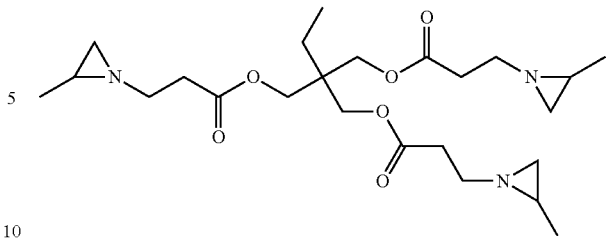

Other exemplary polyaziridine compounds can have 2, 4, 5, 6, or more aziridine groups. Aziridine groups undergo a ring-opening reaction with functional groups on the fluorinated homopolymer, the fluorinated copolymer and the non-fluorinated polymer resulting in an amide linkage, characterized by the presence of a —NH unit. In addition the aziridine compounds can react with surface groups on inorganic nanoparticles allowing the nanoparticle to be an integral element on the dried coating film or layer. The polyaziridine present in the dried coating compositions can be from about 0.5 wt. % to about 5 wt. %, and preferably from about 1 wt. % to about 4 wt. %.

In some embodiments, the coating composition is free of inorganic nanoparticles. In other embodiments, the coating composition comprises inorganic nanoparticles. The inorganic oxide particles are nanoparticles, typically having an average particle size diameter of at least 5 nanometers and typically no greater than 50-100 nanometers and are relatively uniform in size. Preferably, the nanoparticles comprise silica. Nanoparticles can include essentially only silica (although other oxides can be used, such as $ZrO_2$, colloidal zirconia, $Al_2O_3$, colloidal alumina, $CeO_2$, colloidal ceria, $SnO_2$, colloidal tin (stannic) oxide, $TiO_2$, colloidal titanium dioxide). Herein, "silica nanoparticles" refer to nanoparticles that include only silica. The nanoparticle silica present in the dried coating compositions can be from about 0 wt. % to about 20 wt. %, and preferably from about 0 wt. % to about 15 wt. %.

In some embodiments of the invention, the inorganic nanoparticles can be unmodified. Alternatively, the nanoparticles can be surface modified with a hydrophilic organosilane surface treatment that typically comprise hydrophilic groups such as alkylene oxide groups, acids and salts, as well as alcohols. Suitable hydrophilic surface treatments include polyethyleneoxide/polypropyleneoxide trialkoxysilane, sulfonato-organosilanols, also called organosilanol-sulfonic acids/salts having chemical structures like those below and are generally known in the art.

Generally, silica nanoparticles having an average particle size of greater than 20 nm do not require surface modification to provide while smaller particles may require surface modification to enhance solution stability of the resulting coating compositions.

Inorganic silica sols in aqueous media are well known in the art and available commercially. Silica sols in water or water-alcohol solutions are available commercially under the trade designations LUDOX (manufactured by E.I. duPont de Nemours and Co., Inc., Wilmington, Del.), NYACOL (available from Nyacol Co., Ashland, Mass.) or NALCO (manufactured by Nalco Chemical Co., Oak Brook, Ill.). The silica sols generally include counter cations, in order to counter the surface charge of the colloids. Examples of cations suitable for use as counter ions for negatively charged colloids include Na+, K+, Li+, a quaternary ammonium cation such as NR4+, wherein each R can be any monovalent moiety, but is preferably H or lower alkyl, such as —CH3, combinations of these, and the like.

The aqueous fluoropolymer coating compositions can be applied as a liquid directly to suitable polymeric substrate by conventional coating means such as spray, dip, roll, knife, curtain, gravure coating depending on the geometry of the substrate being coated to yield a relatively uniform dried coating. In some embodiments, the thickness of the dried coating can be between about 5 microns and about 100 microns. The exemplary coating composition can be applied as a single coating or as multiple stacked coatings when thicker coating layers are desired.

After application of the coating composition to the substrate, the water is removed, and the fluoropolymer coating adheres to the polymeric substrate. In some embodiments the coating compositions can be coated onto the substrate and allowed to air dry at ambient temperatures. Although not necessary to produce a coalesced film, heating is generally desirable for crosslinking and to dry the coating more quickly. Thus, the drying temperature can be in the range of about 25° C. to about 160° C.

In some embodiments, fluoropolymer coating composition can be applied to the outer jacket of telecommunication cables to increase the lubricity of the cable so that less force will be required when installing the cable in restricted spaces such as in cabling ducts which may already contain a number of existing cables extending therethrough. This is of particular importance when the ducts are not straight (i.e. have one or more corners or junctions).

EXAMPLES

Materials

Unless otherwise noted, all parts, percentages, ratios, etc., in the examples and in the remainder of the specification are by weight.

"5 nm $SiO_2$" was silica nanoparticle dispersion, particle size 5 nm, obtained from Nalco Company, Naperville, Ill., under trade designation "NALCO 2326".

"20 nm $SiO_2$" was silica nanoparticle dispersion, particle size 20 nm, obtained from Nalco Company, Naperville, Ill., under trade designation "NALCO 1050".

"45 nm $SiO_2$" was silica nanoparticle dispersion, particle size 45 nm, obtained from Nalco Company, Naperville, Ill., under trade designation "NALCO DVSZN004".

"75 nm $SiO_2$" was silica nanoparticle dispersion, particle size 45 nm, obtained from Nalco Company, Naperville, Ill., under trade designation "NALCO 2329".

"THV340Z", designated "THV" in Tables 1-3, was a (50 wt.-% solids) dispersion of a polymer of tetrafluoroethylene, hexafluoropropylene and vinylidene fluoride obtained from 3M Company, St. Paul, Minn. under trade designation "3M™ DYNEON™ FLUOROPLASTIC THV 340Z", reported to have an average particle size of 120 nm, a pH of 9.5, and a melting point of 145° C.

"PTFE5035Z", designated "PTFE" in Tables 1-3, was a (58 wt.-% solids) dispersion of a polymer of tetrafluoroethylene obtained from 3M Company, St. Paul, Minn. under trade designation "3M™ DYNEON™ PTFE TF 5035Z", reported to have an average particle size of 220 nm, a pH of >9.

"R966" is an aliphatic polyurethane dispersion available from DSM NeoResins as the trade designation NeoRez™ R-966.

"R9649" is an aliphatic polyurethane dispersion available from DSM NeoResins as the trade designation NeoRez™ R-9649.

"XK-17" is a self-crosslinking polyacrylate dispersion available from DSM NeoResins as the trade designation NeoCryl® XK-17.

"KH792" is an N-(2-aminoethyl)-3-aminopropyltrimethoxysilane was obtained from Zhangjiagang Guotai-Huarong New Chemical Materials Co.

"CX-100" is a polyfunctional aziridine liquid reported to have an equivalent weight of 156 obtained from Royal DSM N.V., Harleen, Netherlands under trade designation "CX-100".

Fluoropolymer Coating Preparation

THV340Z latex dispersion was mixed with PTFE5035Z, followed by diluted with DI water to yield the desired final solids content. After that, the non-fluoropolymer latex (i.e. polyurethanes R966 or R9649 and/or polyacrylate XK-17) latex was added and mixed until to resulting solution appeared homogeneous. The nanoparticle silica, e.g. 2326 (5 nm) or DVSZN004 (45 nm), was added next for samples containing nanoparticle silica. Finally, the polyaziridine CX-100 and an optional silane, e.g. KH792 were added in the last step in the appropriate samples. The solution was allowed to stand for at least 5 hr prior to coating. Exemplary formulations are summarized in Tables 1. The weight percentages used in the tables represent the amount of each component in the dried coating (i.e. the water is not represented in the weight percentages shown). Table 2 shows the formulations of a number of comparative examples. Table 3 list the formulations low friction coating with alternative non-fluorinated polymer dispersions.

In an exemplary aspect the desired solids content can be about 4%, 10%, 20% or 30%. In general all examples and comparative samples were diluted to a solids content of 20%. Examples 17 and 18 was prepared at a solids content of 32% and Comparative example C7 was prepared at 29%. Example 16 was prepared at a solids content of 4% and the effects of solids content on coating performance is shown in Table 9 for the coating formulation of example 13 coated on polyethylene film.

TABLE 1

Formulation information for exemplary formulations and Comparative examples.

| Examples | THV | PTFE | Polyurethane R966 | Aziridine | Nanoparticle Silica |
|---|---|---|---|---|---|
| 1 | 68.9 | 23.1 | 4.4 | 3.6 | 0.0 |
| 2 | 64.6 | 22.3 | 9.0 | 4.1 | 0.0 |
| 3 | 61.4 | 21.0 | 13.4 | 4.3 | 0.0 |
| 4 | 52.5 | 17.3 | 27.5 | 2.7 | 0.0 |
| 5 | 74.6 | 16.8 | 4.5 | 4.1 | 0.0 |
| 6 | 63.7 | 28.2 | 4.4 | 3.7 | 0.0 |
| 7 | 69.9 | 23.5 | 4.5 | 2.1 | 0.0 |
| 8 | 68.0 | 22.8 | 4.4 | 4.8 | 0.0 |
| 9 | 63.2 | 21.3 | 4.1 | 3.2 | 8.2 (5 nm) |
| 10 | 58.5 | 19.7 | 3.8 | 2.9 | 5.1 (5 nm) |
| 11 | 63.2 | 21.3 | 4.1 | 3.2 | 8.2 (45 nm) |
| 12 | 54.4 | 36.0 | 7.8 | 1.8 | 0.0 |
| 13 | 18.8 | 69.5 | 11.6 | 2.0 | 0.0 |
| 14 | 64.4 | 23.6 | 4.7 | 3.6 | 2.8 (20 nm) |
| 15 | 58.5 | 19.7 | 3.8 | 2.9 | 15.1 (75 nm) |
| 16 | 65.4 | 22.0 | 4.2 | 3.3 | 5.1 (20 nm) |
| 17 | 12.5 | 75.3 | 10.2 | 1.9 | 0.0 |
| 18 | 9.5 | 57.3 | 31.2 | 1.9 | 0.0 |
| 19 | 17.4 | 52.5 | 28.5 | 1.6 | 0.0 |
| 20 | 6.6 | 80.0 | 10.9 | 2.5 | 0.0 |
| 21 | 20.3 | 61.1 | 16.6 | 2.0 | 0.0 |
| 22 | 33.6 | 50.6 | 13.8 | 2.0 | 0.0 |
| 23 | 13.2 | 79.7 | 5.4 | 1.6 | 0.0 |
| 24 | 36.2 | 54.5 | 7.4 | 1.9 | 0.0 |
| 25 | 35.3 | 53.1 | 7.2 | 1.8 | 2.7 (20 nm) |

TABLE 1-continued

Formulation information for exemplary formulations and Comparative examples.

| Examples | THV | PTFE | Polyurethane R966 | Aziridine | Nanoparticle Silica |
|---|---|---|---|---|---|
| 26 | 11.5 | 69.4 | 9.4 | 1.4 | 8.2 (20 nm) |
| 27 | 88.0 | 5.0 | 5.0 | 2.0 | 0.0 |
| 28 | 4.0 | 90.0 | 4.0 | 2.0 | 0.0 |
| 29 | 19.0 | 19.0 | 60.0 | 2.0 | 0.0 |
| 30 | 9.0 | 9.0 | 80.0 | 2.0 | 0.0 |
| 31 | 29.0 | 29.0 | 40.0 | 2.0 | 0.0 |
| 32 | 64.6 | 8.8 | 19.5 | 4.4 | 2.7 (45 nm) |

TABLE 2

Exemplary control formulations

| Comparative Examples | THV | PTFE | Polyurethane R966 | Aziridine | Nanoparticle Silica |
|---|---|---|---|---|---|
| C1 | 71.4 | 24.0 | 4.6 | 0.0 | 0.0 |
| C2 | 74.0 | 24.9 | 0.0 | 1.1 | 0.0 |
| C3 | 0.0 | 34.7 | 65.3 | 0.0 | 0.0 |
| C4 | 0.0 | 54.1 | 45.9 | 0.0 | 0.0 |
| C5 | 0.0 | 53.4 | 45.2 | 3.0 | 0.0 |
| C6 | 0.0 | 76.0 | 22.0 | 2.0 | 0.0 |
| C7 | 14.0 | 84.8 | 0.0 | 1.6 | 0.0 |

TABLE 3

Examples of formulations alternate non-fluorinated polymer dispersions

| Examples | THV | PTFE | Polyurethane R9649 | Polyacrylate XK-17 | Aziridine | Silane |
|---|---|---|---|---|---|---|
| 33 | 68.8 | 23.2 | 4.5 | 0.0 | 3.5 | 0.0 |
| 34 | 72.4 | 24.2 | 0.0 | 2.3 | 0.5 | 0.6 |
| C8 | 96.3 | 0.0 | 0.0 | 2.3 | 1.4 | 0.0 |

Some formulations without THV or PTFE or PU or CX-100 were designed as control examples (C1-C6). The described fluoropolymer latex dispersions were diluted to 20 wt-% solids or 30 wt-% solids with deionized water unless indicated otherwise. When present, (unmodified or modified) silica nanoparticles were added to the fluoropolymer latex dispersion at the weight ratio of solids described in the tables. Subsequently, the described aziridine compounds were added at the amount indicated. The mixed dispersions were coated on IPA wiped substrate, for example a PET film substrate, with a #10 Meyer bar unless indicated otherwise. The PET films were dried at 150-160° C. for 2 minutes unless indicated otherwise. In an alternative aspect, a PE film substrate was coated as above and dried to 80° C. for 2 minutes.

Film Test Methods

Samples were made by coating the solution on to a substrate for example a clear PET film (2 mil, non-primer side), or a 2 mil PE film by Meyer bar with 10 microns wet thickness. The sample was heated at 160° C. for 2 minutes.

Optical Performance Test

Transmission and haze was measured using a haze-gard dual available from BYK-Gardner GmbH (Germany). The transmission was recorded or directly read from the instrument as the average of the solar daylight wavelength range (CIE D65 standard illuminant) according to ASTM D1003.

Coefficient of Friction (COF) Measurement

The static COF was measured using an American Slip Meter ASM825A available from American Slip Meter, Inc. (Englewood, Fla., USA) COF tester with 2 Kg load and Neolite rubber as sensor. Three different areas were tested and averaged.

Abrasion Test

The dry abrasion resistance was evaluated by Wet Abrasion Scrub Tester REF 903 available from Sheen Instruments (Cambridge, UK). The dry abrasion test was done under a 1 kg load with Miaojie scouring pad without sand as abrasion medium. After 100 abrasion cycles, the COF and optical property (transmission and haze) was tested again. For some examples, the test continues to 200, 300, 400 and even 5000 abrasion cycles.

Contact Angle Test

Contact angle (CA) was tested on a Drop Shape Analysis System (Kruss DSA100, Germany) at ambient temperature. The average CA value was obtained by measuring more than five different positions for the same sample. The volume of water droplet was set to be 5 µL. The test was conducted before and after abrasion test.

Table 4 shows the initial and post abrasion test data for a number of low friction coating formulations coated on a PET film substrate. Table 5 shows the initial and post abrasion coefficient of friction results for a number of exemplary coating formulations that were coated onto a PE film substrate. Table 6 shows the initial and post abrasion coefficient of friction results for a number of additional exemplary coating formulations that were coated onto a PE film substrate and onto a PET film substrate. Table 7 shows the effects of abrasion on the coefficient of friction of a number of exemplary coatings disposed on a PET film substrate. Table 8 compares the coefficient of friction of a coating from the low friction coating formulation in Example 13 disposed on variety of flat substrates including a polyurethane (PU) film, a polymethylmethacrylate (PMMA) film, a glass plate and a stainless steel plate.

TABLE 4

Properties measured on PET film substrate

| Example | Initial Values | | | | No. of cycles | After abrasion | | | |
|---|---|---|---|---|---|---|---|---|---|
| | ΔT(%) | Haze | COF | CA | | ΔT(%) | Haze | COF | CA |
| 1 | 2.6 | 2.7 | 0.47 | 95.9 | 5000 | 2.4 | 3.6 | 0.08 | 105.1 |
| 2 | 2.2 | 3.2 | 0.56 | | | | | | |
| 3 | 2.0 | 2.7 | 0.53 | | | | | | |
| 4 | 2.1 | 2.5 | 0.70 | | | | | | |
| 5 | 2.3 | 3.7 | 0.49 | | | | | | |

TABLE 4-continued

Properties measured on PET film substrate

| Example | Initial Values ΔT(%) | Haze | COF | CA | After abrasion No. of cycles | ΔT(%) | Haze | COF | CA |
|---|---|---|---|---|---|---|---|---|---|
| 6 | 2.4 | 5.2 | 0.48 | | | | | | |
| 7 | 2.1 | 3.0 | 0.49 | 94.0 | 100 | 1.9 | 5.6 | 0.08 | 115.7 |
| 8 | 2.0 | 2.8 | 0.43 | 98.3 | 100 | 2.1 | 5.4 | 0.08 | 111.4 |
| 9 | 2.7 | 4.9 | 0.33 | 106.7 | 100 | 2.7 | 3.9 | 0.03 | 117.5 |
| 10 | 2.6 | 4.4 | 0.33 | 115.8 | 100 | 2.6 | 7.2 | 0.06 | 122.8 |
| 11 | 2.4 | 3.1 | 0.51 | 103.6 | 100 | 2.3 | 4.9 | 0.09 | 120.6 |
| 33 | 2.2 | 3.6 | 0.39 | 102.1 | 100 | 2.2 | 4.4 | 0.14 | 106.3 |
| 34 | 2.2 | 2.8 | 0.47 | 101.1 | 100 | 2.4 | 4.7 | 0.13 | 111.8 |
| C1 | 1.7 | 3.3 | 0.58 | 98.0 | 400 | 2.4 | 9.2 | 0.12 | 110.0 |
| C2 | 2.3 | 3.0 | 0.47 | 90.9 | 100 | 2.3 | 4.4 | 0.23 | 111.8 |
| C3 | 0.2 | 5.2 | 0.64 | 68.9 | 100 | −0.1 | 9.5 | 0.84 | 83.0 |
| C4 | −0.3 | 6.1 | 0.36 | 98.1 | 400 | −0.2 | 14.7 | 0.98 | 79.0 |
| C5 | −0.1 | 5.6 | 0.51 | 101.1 | 5000 | 1.1 | 35.5 | 0.45 | 89.5 |
| C8 | 2.7 | 10.2 | 0.73 | | | | | | |
| Uncoated PET Film | 0 | 1.5-2.0 | >1.32 | 49.4 | | | | | |

TABLE 5

Coefficient of friction of exemplary coatings disposed on a PE film substrate

| Example | Initial COF | No. of abrasion cycles | COF after abrasion | No. of abrasion cycles | COF after abrasion |
|---|---|---|---|---|---|
| C6 | 0.31 | 640 | 0.29 | 1000 | 0.23 |
| 3 | 0.48 | 640 | 0.28 | 1000 | 0.22 |
| 9 | 0.28 | 500 | 0.28 | 500 | 0.22 |
| 12 | 0.21 | 640 | 0.23 | 1000 | 0.10 |
| 13 | 0.22 | 500 | 0.21 | 500 | 0.21 |
| 14 | 0.47 | 640 | 0.23 | 1000 | 0.13 |
| 15 | 0.47 | | | | |
| 16 | 0.42 | | | | |
| Uncoated PE Film | 0.63 | | | | |

TABLE 6

Coefficient of friction of exemplary coatings disposed on a PE and PET film substrates

| Examples | Initial COF on PE film | Initial COF on PET film | COF after 500 abrasion cycles on PE film | COF after 500 abrasion cycles on PET film |
|---|---|---|---|---|
| 17 | 0.21 | 0.23 | 0.13 | 0.15 |
| 18 | 0.41 | 0.43 | 0.33 | 0.20 |
| 19 | 0.22 | 0.22 | 0.43 | 0.15 |
| 20 | 0.31 | 0.33 | 0.17 | 0.19 |
| 21 | 0.33 | 0.33 | 0.16 | 0.18 |
| 22 | 0.30 | 0.38 | 0.25 | 0.22 |
| 23 | 0.38 | 0.41 | 0.19 | 0.23 |
| 24 | 0.41 | 0.43 | 0.24 | 0.22 |
| 25 | 0.42 | 0.45 | 0.21 | 0.19 |
| 26 | 0.32 | 0.32 | 0.20 | 0.18 |
| 27 | 0.56 | 0.50 | 0.53 | 0.46 |
| 28 | 0.49 (Poor appearance) | 0.38 (Poor appearance) | 032 | 0.36 |
| 29 | 0.80 | 0.78 | 0.68 | 0.62 |
| 30 | 0.88 | 0.83 | 0.68 | 0.63 |
| 31 | 0.61 | 0.58 | 0.55 | 0.56 |
| C7 | 0.34 | 0.33 | 0.28 | 0.31 |

TABLE 7

The effects of abrasion on the coefficient of Friction of exemplary coatings disposed on a PET film substrate

| Example | Initial COF | COF after 100 abrasion cycles | COF after 200 abrasion cycles | COF after 300 abrasion cycles | COF after 400 abrasion cycles | COF after 500 abrasion cycles |
|---|---|---|---|---|---|---|
| 1 | 0.47 | 0.08 | 0.04 | 0.03 | 0.03 | 0.44 |
| C1 | 0.58 | 0.12 | 0.9 | 0.2 | 0.16 | |
| C4 | 0.36 | 0.55 | 0.81 | 0.77 | 0.98 | |
| C5 | 0.51 | 0.35 | 0.28 | 0.26 | 0.25 | 0.45 |

TABLE 8

Coefficient of friction of a coating disposed on variety of flat substrates from the low friction coating formulation in Example 13

| | COF of uncoated substrate | Initial COF | COF after 500 abrasion cycles |
|---|---|---|---|
| PU film | 0.91 | 0.32 | 0.20 |
| PMMA film | 0.67 | 0.31 | 0.21 |
| glass | 0.56 | 0.27 | 0.14 |
| Stainless steel | 0.75 | 0.26 | 0.43 |

TABLE 9

The effect of percent solids on the coefficient of friction of a coating disposed on a polyethylene film from the low friction coating formulation in Example 13

| Percent solids in coating formulation | Initial COF | COF after 500 cycle abrasion |
|---|---|---|
| 10% | 0.21 | 0.18 |
| 20% | 0.22 | 0.21 |
| 30% | 0.25 | 0.19 |

In general, the solid content in the coating formulation did not significantly affect the low friction performance of the coating. The percent solids of the formulations can be used to control the thickness of the final coating layer with lower solid content formulations producing a thinner final coating layer than higher solids content formulations.

In addition, the exemplary low friction dispersion coating formulations produced dried coatings having a high degree of optical clarity, anti-reflection property, highly hydrophobic property, and improved mechanical and chemical resistance properties.

Cable Test Methods Samples were made by dip coating process in which the cable was run through a baths holding the desired coating formulation. A thin film of the liquid coating material remained on the jacket of a telecommunications cable. The coating can be dried at room temperature, at about 50° C., at about 80° C., at about 100° C. or at about 120° C. The drying temperature can be selected in accordance with the type of cable (i.e. the composition of the outer jacket material) being coated and the desired coating speed. Elevating the drying temperature allows the coating to dry faster which can enable the long lengths of cable to be coated and dried via a continuous coating process. Exemplary telecommunication cables can include, for example, a polyethylene jacketed FRP type cable (available from Yangtze Optical Fibre and Cable Company Ltd., (China) designated as cable 1, 3M company (China) designated as cable 2 and Prysmian Group (Italy) designated as cable 3), a round cable having a PVC jacket (available from Prysmian Group (Italy) designated as cable 4) or the like.

Friction Force Measurement Between Cables

The lubricating performance was evaluated according to test method illustrated in FIG. 1. For example, FIG. 1 is a cross-sectional view of the test arrangement having four pieces of cable 10 fixed to each of two metal plates 20 by a piece of double sided adhesive tape (not shown), such as 3M™ VHB™ Tape for example 3M™ 4949 VHB™ tape available from 3M Company (St. Paul Minn., USA). The test sample 30 is placed between the two plates with the fixed optical fiber cable so that the test sample is sandwiched between the fixed optical cables. A static load 40 is exerted onto the test setup. The test cable is pulled through (i.e. into the page) the test setup at a controlled speed. The force required to pull the cable is recorded.

Specifically, four pieces of cable having the same low friction coated surface as the test sample, for example four pieces of coated FRP cable with 150 mm length were fixed to each of two parallel stainless steel plates. The cable sample being tested sample piece of cable was positioned between the two cable covered panels and a 2 Kg load, $F_v$, was applied. The test sample piece of cable was withdrawn from the test fixtures using an Instron machine with an extraction speed of 400-500 mm/min.

The initial force measured, $F_o$, is the static friction force. The coefficient of Static friction, $\mu_o$, can be calculated by $$\mu_o = \frac{F_o}{2F_v}$$

The average dynamic force, $F_A$, is measured after the initial force spike (e.g. from 4 s after the beginning of the test to about 20 s after the beginning of the test). The coefficient of sliding friction, $\mu_s$, can be calculated by $$\mu_s = \frac{F_A}{2F_v}$$

Friction Force Measurement Between a Cable and a Duct.

Figure 2:
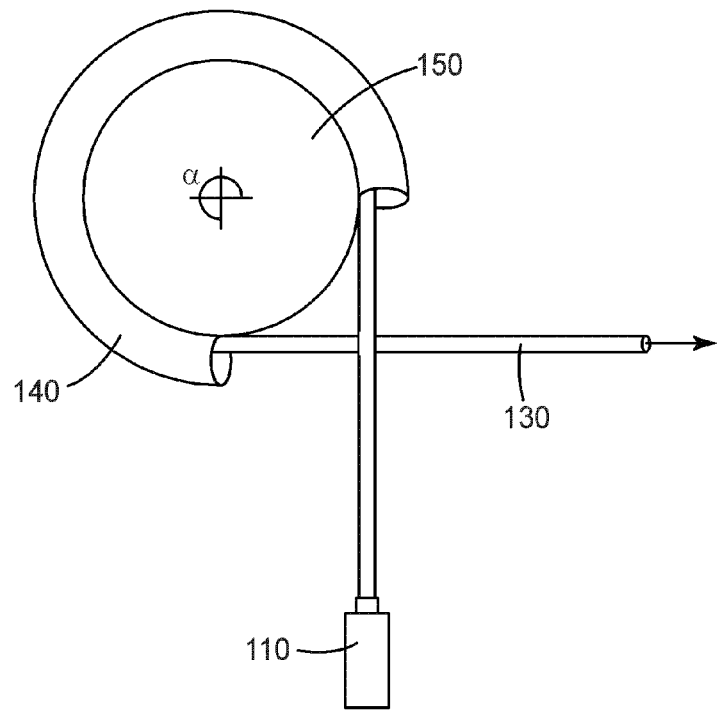
FIG. 2 is a schematic view of the test arrangement used to determine the coefficient of friction between a cable and a duct.

FIG. 2 shows the test arrangement for determining the COF of a cable 130 being pulled through a duct 140. A duct, for example a smooth circular 4.6 mm thick HDPE duct (not grooved) having an outside diameter of 50 mm, is wound three quarters of the way around a rigid support 150 that has a fixed diameter of 1 m. The inside surface of the duct should be free of dust, clean, dry, not lubricated and not marked.

A cable sample of about 10 m long is inserted into the duct as shown on FIG. 2. An initial load is applied to one of the end of the cable such as by using a 1 kg or 2 kg weight. The initial load should be sufficiently large to force the sample into contact with the bottom of the duct. The other end of the cable is connected to a device that pulls the cable at a prescribed speed and measures the average force, $F_M$, necessary to pull 500 mm of cable through the duct. The coefficient of friction in a duct, $\mu_d$, is calculated from the measured force using the following formula:

$$\mu_d = \frac{1}{\alpha} \ln \frac{F_m}{L_o}$$

Where $L_o$ is the initial load applied to the cable*9.81 and $\alpha$ is the degrees (in radians) that the duct is wrapped around the rigid support.

Abrasion Test on Cable

The dry abrasion resistance was evaluated by Wet Abrasion Scrub Tester REF 903 available from Sheen Instruments (Cambridge, UK). Five sections of coated cable having a length of about 50 cm are fixed side by side to the scrub tester. The dry abrasion test was done under a 1 kg load with a Miaojie scouring pad as the abrasion medium. After 33 abrasion cycles, the COF was tested again.

Table 10 shows the coefficient of static friction and the coefficient of sliding friction between different cables that have been coated with the exemplary low friction coating formulation of the present disclosure before and after abrasion, and Table 11 shows the coefficient of static friction and the coefficient of sliding friction between different a cable that have been coated with a different exemplary low friction coating formulation of the present disclosure. Tables 12 and 13 show the coefficient of friction measured between a variety of cables and a polyethylene duct before and after abrasion for cables that have been coated with the exemplary low friction coating formulations of the present disclosure.

TABLE 10

Inter-cable friction properties of cables coated with the low friction coating the formulation of example 13

| Cable | Dimensions (mm*mm) | Coefficient of static friction, $\mu_o$ | | | Coefficient of sliding friction, $\mu_s$ | | |
|---|---|---|---|---|---|---|---|
| | | Uncoated | Coated | After Abrasion | Uncoated | Coated | After Abrasion |
| Cable 1 | 2.0*3.0 | 0.80 | 0.23 | 0.25 | 0.64 | 0.22 | 0.22 |
| Cable 2 | 2.0*3.0 | 0.71 | 0.20 | 0.19 | 0.64 | 0.17 | 0.18 |

TABLE 10-continued

Inter-cable friction properties of cables coated with
the low friction coating the formulation of example 13

| Cable | | Coefficient of static friction, $\mu_o$ | | | Coefficient of sliding friction, $\mu_s$ | | |
|---|---|---|---|---|---|---|---|
| | Dimensions (mm*mm) | Uncoated | Coated | After Abrasion | Uncoated | Coated | After Abrasion |
| Cable 3 | 1.7*2.5 | 0.78 | 0.21 | 0.21 | 0.73 | 0.20 | 0.20 |
| Cable 4 | 5 mm round | 0.40 | 0.24 | 0.23 | 0.38 | 0.21 | 0.22 |

TABLE 11

Inter-cable friction properties of cables coated with the
low friction coating the formulation of example 12

| | Cable Dimensions | Coefficient of static friction, $\mu_o$ | |
|---|---|---|---|
| | (mm * mm) | Uncoated | Coated |
| Cable 1 | 2.0 * 3.0 | 0.80 | 0.27 |
| Cable 1 | 2.0 * 3.0 | 0.71 | 0.23 |

TABLE 12

Friction properties of cables coated with formulation
13 of a cable pulled through a polyethylene duct

| | Dimension | Load/ | Force/N | | Coefficient of friction | |
|---|---|---|---|---|---|---|
| | (mm*mm) | Kg | Uncoated | Coated | Uncoated | Coated |
| Cable 1 | 2.0*3.0 | 1 | 71 | 34 | 0.42 | 0.26 |
| | | 2 | 151 | 58 | 0.43 | 0.21 |
| Cable 2 | 2.0*3.0 | 1 | 84 | 30 | 0.46 | 0.24 |
| | | 2 | 125 | 47 | 0.39 | 0.19 |
| Cable 3 | 1.7*2.5 | 1 | 78 | 34 | 0.44 | 0.26 |
| | | 2 | 149 | 53 | 0.43 | 0.21 |
| Cable 4 | 5 mm round | 1 | 56 | 39 | 0.43 | 0.29 |
| | | 2 | 98 | 55 | 0.34 | 0.21 |

TABLE 13

Friction properties of cables coated with formulations
12 and 33 of a cable pulled through a polyethylene duct

| | Dimension | Load/ | Force/N | | Coefficient of friction | |
|---|---|---|---|---|---|---|
| | (mm*mm) | Kg | Uncoated | Coated | Uncoated | Coated |
| Example 12 on Cable 2 | 2.0*3.0 | 1 | 84 | 33 | 0.46 | 0.24 |
| | | 2 | 125 | 50 | 0.39 | 0.20 |
| Example 33 on Cable 2 | 2.0*3.0 | 1 | 84 | 42 | 0.46 | 0.31 |
| | | 2 | 125 | 82 | 0.39 | 0.30 |

Atomic force microscopy reveals that the highly crystalline PTFE particles remain islands surrounded by a continuous phase comprising the fluorinated copolymer and the nonfluorinated polymer. In addition, there is a non-fluorinated rich layer adjacent to the surface of polymer substrate which improves the adhesion of the coating to the polymer substrate.

Figure 3:
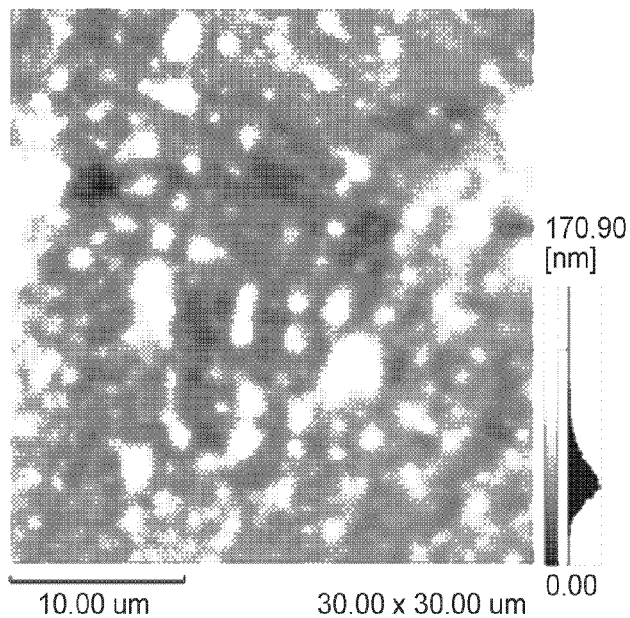
FIG. 3 is an electron micrograph showing an exemplary dried coating.
Figure 4:
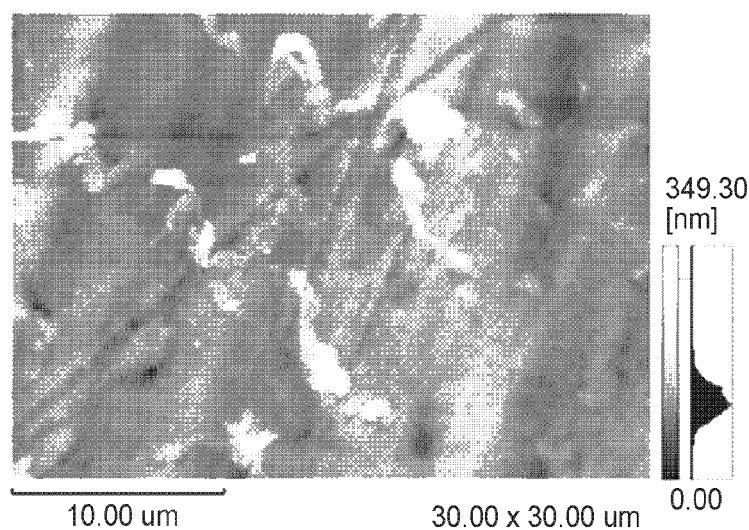
FIG. 4 is an electron micrograph showing an exemplary dried coating after abrasion.

FIGS. 3 and 4 atomic force micrographs showing the morphology an exemplary dried coating disposed on a polymer film substrate before and after abrasion. Prior to abrasion, the PTFE particles can be seen as discrete domains in the continuous matrix. After abrasion, the PTFE particles become fibrillated or smeared out so that a greater percentage of the surface is covered by PTFE. In particular, FIG. 4 shows the deformation of spherical fluoropolymer nanoparticles into extended PFTE fibrils. Fibrillation of the PTFE nanoparticles by abrasion can result in the decrease in the COF and increase of water contact angle can be seen in the examples after abrasion.

An exemplary fluoropolymer coating composition includes a fluorinated homopolymer particles dispersed in water, a fluorinated copolymer particles dispersed in water, a non-fluorinated polymer particles dispersed in water; and at least one aziridine compound comprising at least two aziridine groups. In one exemplary aspect, the non-fluorinated polymer particles in the fluoropolymer coating composition can be a polyurethane latex material and/or an acrylic latex material. In another exemplary aspect, the fluorinated homopolymer particles comprise polytetrafluoroethylene latex while in another aspect, the fluorinated copolymer particles is a copolymer of tetrafluoroethylene, hexafluoropropylene and vinylidene fluoride. The exemplary fluoropolymer coating can optionally include inorganic oxide nanoparticles, e.g. nanoparticle silica having an average particle size of less than 50 nm.

The exemplary fluoropolymer coating composition can be applied to articles having an exposed polymer surface to yield an article having a low fiction surface. In particular, an article having a low friction surface comprises a substrate having an exposed polymer surface and a thin layer of a low friction coating disposed on the exposed polymer surface of the substrate, wherein the low friction coating comprises a fluorinated homopolymer, a fluorinated copolymer, and non-fluorinated polymer; that have been crosslinked by a polyazidine crosslinking agent. In an exemplary aspect, the exposed polymer surface comprises a low surface energy plastic. Alternatively, wherein the exposed polymer surface can be selected from polyethylene, polyester, and polyvinylchloride.

In one embodiment of the invention, the low friction coating can be applied onto the exposed polymer surface of the substrate from an aqueous coating dispersion at a temperature of less than 50° C. While in another aspect, the aqueous coating dispersion is applied at room temperature and dried to remove the water leaving the low friction coating on the exposed polymer surface of the substrate.

In one exemplary aspect, the non-fluorinated polymer in the low friction coating can be a polyurethane latex material and/or an acrylic latex material. In another exemplary aspect, the fluorinated homopolymer in the low friction coating is a polytetrafluoroethylene latex, while in another aspect the fluorinated copolymer in the low friction coating comprises tetrafluoroethylene, hexafluoropropylene and vinylidene fluoride. The exemplary low friction coating can optionally include inorganic oxide nanoparticles, e.g. nanoparticle silica.

In one embodiment, the substrate in the article having a low friction surface can be a film or sheet substrate. The film substrate can be a polymer film, a polymer film having one metalized polymer surface, or a material which has a laminated polymer surface, or a polymer coated surface.

In an alternative embodiment, the article is a low friction telecommunication cable comprising at least one optical fiber surrounded by a polymeric cable jacket wherein the low friction coating is applied to an external surface polymeric cable jacket. In an exemplary aspect, the telecommunication cable will have a thin layer of the low friction coating (i.e. a coating thickness that is less than 100 microns) disposed on the outer surface of polymeric cable jacket. In an alternative aspect, the coated telecommunication cable can be characterized by a ratio of the coating thickness to the minimum critical the of the telecommunication cable is 6:94, wherein the minimum critical dimension of the telecommunication cable dimension is defined as the minimum diameter, width or height of the cross-section of the telecommunication cable coated with the low friction coating. In an exemplary aspect, the telecommunication cable is an FRP drop cable.

In one embodiment of the exemplary friction telecommunication cable described above, the coefficient of friction of an uncoated telecommunication cable is about two times greater than the coefficient of friction of the low friction telecommunication cable. Alternatively, the coefficient of friction of an uncoated telecommunication cable is more than three times greater than the coefficient of friction of the low friction telecommunication cable.

What is claimed is:

1. A fluoropolymer coating composition comprising:
   fluorinated homopolymer particles dispersed in water,
   fluorinated copolymer particles dispersed in water, wherein the fluorinated copolymer particles comprise a copolymer of tetrafluoroethylene, hexafluoropropylene and vinylidene fluoride,
   non-fluorinated polymer particles dispersed in water; and
   at least one aziridine compound comprising at least two aziridine groups,
   wherein the fluoropolymer coating comprises 3 wt. % to about 35 wt. %, non-fluorinated polymer, 15 wt. % to 75 wt. % fluorinated homopolymer and 10 wt. % to 75 wt. % fluorinated copolymer after drying.

2. The fluoropolymer coating composition of claim 1 wherein the non-fluorinated polymer particles comprise a polyurethane latex material.

3. The fluoropolymer coating composition of claim 1 wherein the non-fluorinated polymer particles comprise an acrylic latex material.

4. The fluoropolymer coating composition of claim 1 wherein the fluorinated homopolymer particles comprise polytetrafluoroethylene.

5. The fluoropolymer coating composition of claim 1 further comprising inorganic oxide nanoparticles.

6. The fluoropolymer coating composition of claim 5 wherein the inorganic oxide nanoparticles comprise nanoparticle silica having an average particle size of less than 100 nm.

7. An article having a low friction surface, comprising:
   a substrate having an exposed polymer surface and a thin layer of a low friction coating disposed on the exposed polymer surface of the substrate, wherein the low friction coating comprises a fluorinated homopolymer, a fluorinated copolymer wherein the fluorinated copolymer particles comprise a copolymer of tetrafluoroethylene, hexafluoropropylene and vinylidene fluoride, and non-fluorinated polymer; that have been crosslinked by a polyazidine crosslinking agent, wherein the fluoropolymer coating comprises 3 wt. % to about 35 wt. %, non-fluorinated polymer, 15 wt. % to 75 wt. % fluorinated homopolymer and 10 wt. % to 75 wt. % fluorinated copolymer after drying.

8. The article of claim 7, wherein the exposed polymer surface comprises a low surface energy plastic.

9. The article of claim 7, wherein the exposed polymer surface can be selected from polyethylene, polyester, and polyvinyl chloride.

10. The article of claim 7, wherein the non-fluorinated polymer comprises at least one of a polyurethane and an acrylic polymer.

11. The article of claim 7, wherein the fluorinated homopolymer is polytetrafluoroethylene.

12. The article of claim 7, further comprising inorganic oxide nanoparticles.

13. The article of claim 7, wherein the substrate is a film substrate.

14. The article of claim 7, wherein the article is a low friction telecommunication cable comprising at least one optical fiber surrounded by a polymeric cable jacket wherein the low friction coating is applied to the external surface polymeric cable jacket.

15. The article of claim 14, wherein the low friction coating has a coating thickness that is less than 100 microns.

16. The article of claim 14, wherein telecommunication cable can be characterized by a minimum critical dimension and wherein the ratio of the coating thickness to the minimum critical dimension of the telecommunication cable is 6:94.

17. The article of claim 14, wherein the coefficient of friction of an uncoated telecommunication cable is about two times greater than the coefficient of friction of the low friction telecommunication cable.

18. The article of claim 14, wherein the coefficient of friction of an uncoated telecommunication cable is more than three times greater than the coefficient of friction of the low friction telecommunication cable.

* * * * *

UNITED STATES PATENT AND TRADEMARK OFFICE
CERTIFICATE OF CORRECTION

PATENT NO. : 10,000,716 B2
APPLICATION NO. : 15/039894
DATED : June 19, 2018
INVENTOR(S) : Zhigang Yu et al.

Page 1 of 1

It is certified that error appears in the above-identified patent and that said Letters Patent is hereby corrected as shown below:

On the Title Page

In Column 1, item (73) Assignee, Lines 1-2, delete "3M Innovative Properties Company, St. Paul, MN (US)" and insert -- Corning Research & Development Corporation, Corning, NY (US) --, therefor.

Signed and Sealed this
Twenty-second Day of September, 2020

Andrei Iancu
*Director of the United States Patent and Trademark Office*